(12) United States Patent
Kent et al.

(10) Patent No.: US 10,291,658 B2
(45) Date of Patent: May 14, 2019

(54) TECHNIQUES TO APPLY AND SHARE REMOTE POLICIES ON MOBILE DEVICES

(75) Inventors: Jonathan Kent, Seattle, WA (US); Michael Hamler, Kirkland, WA (US); Shivakumar Seetharaman, Snoqualmie, WA (US); Gregory Bolles, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/292,346

(22) Filed: Nov. 9, 2011

(65) Prior Publication Data

US 2013/0117805 A1 May 9, 2013

(51) Int. Cl.
*H04L 29/06* (2006.01)
*G06F 21/45* (2013.01)
*H04L 29/08* (2006.01)

(52) U.S. Cl.
CPC ............ *H04L 63/205* (2013.01); *G06F 21/45* (2013.01); *H04L 67/025* (2013.01)

(58) Field of Classification Search
CPC ....... G06F 21/41; G06F 21/45; H04L 63/205; H04L 63/20; H04L 63/1425; H04L 67/025
USPC ............................................................ 726/1
See application file for complete search history.

(56) References Cited

U.S. PATENT DOCUMENTS

| | | | |
|---|---|---|---|
| 7,496,954 B1 * | 2/2009 | Himawan et al. | 726/8 |
| 7,809,353 B2 | 10/2010 | Brown et al. | |
| 7,921,182 B2 | 4/2011 | Hamasaki, Jr. et al. | |
| 2003/0081621 A1 * | 5/2003 | Godfrey et al. | 370/400 |
| 2004/0193703 A1 * | 9/2004 | Loewy et al. | 709/220 |
| 2004/0215702 A1 * | 10/2004 | Hamasaki et al. | 709/201 |
| 2005/0251865 A1 * | 11/2005 | Mont | G06F 21/6245 726/26 |

(Continued)

FOREIGN PATENT DOCUMENTS

| | | |
|---|---|---|
| CN | 101076988 A | 11/2007 |
| JP | 2001117661 A | 4/2001 |

(Continued)

OTHER PUBLICATIONS

Wassim Itani, Ayman Kayssi, SPECSA: a scalable, policy-driven, extensible, and customizable security architecture for wireless enterprise applications, Computer Communications, vol. 27, Issue 18, Dec. 1, 2004, pp. 1825-1839, ISSN 0140-3664, 10.1016/j.comcom.2004.07.001.*

(Continued)

*Primary Examiner* — Syed A Zaidi (57) ABSTRACT

Techniques to apply and share remote policies on personal devices are described. In an embodiment, a technique includes contacting an enterprise server from an enterprise application operating on a personal device. The enterprise application may receive policies from the enterprise server. The policies may be applied to the enterprise application. When a second enterprise application on the personal device is launched, the policies may also be applied to the second enterprise application. When a policy is changed on the enterprise server, notification is pushed to the personal device and all related enterprise applications on the personal device may be updated to enforce the policy change. Other embodiments are described and claimed.

20 Claims, 7 Drawing Sheets

(56) References Cited

U.S. PATENT DOCUMENTS

| | | | |
|---|---|---|---|
| 2006/0070131 A1 | 3/2006 | Braddy et al. | |
| 2006/0074618 A1* | 4/2006 | Miller et al. | 703/13 |
| 2006/0190724 A1* | 8/2006 | Adams et al. | 713/166 |
| 2006/0277590 A1 | 12/2006 | Limont et al. | |
| 2007/0118558 A1* | 5/2007 | Kahandaliyanage | 707/104.1 |
| 2007/0156695 A1* | 7/2007 | Lim | 707/9 |
| 2007/0157288 A1* | 7/2007 | Lim | 726/1 |
| 2007/0160079 A1* | 7/2007 | Han et al. | 370/465 |
| 2007/0298767 A1* | 12/2007 | Brown et al. | 455/411 |
| 2008/0034425 A1* | 2/2008 | Overcash et al. | 726/22 |
| 2008/0070495 A1* | 3/2008 | Stricklen | H04W 8/22 455/3.01 |
| 2008/0148042 A1 | 6/2008 | Brown et al. | |
| 2009/0205037 A1 | 8/2009 | Asakura | |
| 2010/0024020 A1* | 1/2010 | Baugher | G06F 21/6245 726/7 |
| 2010/0210240 A1 | 8/2010 | Mahaffey et al. | |
| 2011/0209196 A1* | 8/2011 | Kennedy | 726/1 |
| 2012/0036552 A1* | 2/2012 | Dare et al. | 726/1 |

FOREIGN PATENT DOCUMENTS

| | | |
|---|---|---|
| JP | 2004265286 A | 9/2004 |
| JP | 2006500657 A | 1/2006 |
| JP | 2007-35041 | 2/2007 |
| JP | 2007524878 A | 8/2007 |
| KR | 10-2005-0026624 | 3/2005 |
| KR | 10-0930190 B1 | 12/2009 |
| TW | 200830200 | 7/2008 |
| TW | 201112719 | 4/2011 |
| WO | 2009157493 A1 | 12/2009 |
| WO | 2011136150 A1 | 11/2011 |

OTHER PUBLICATIONS

"Securing end-user mobiledevices in the enterprise", Retrieved at <<http://public.dhe.ibm.com/common/ssi/ecm/en/azw03001usen/AZW03001USEN.PDF>>, Apr. 2011, pp. 6.

Storts, John., "Mobile Devices: Remote Wipe Policy Helps Protect Business Data", Retrieved at <<http://www.itbusinessedge.com/cm/blogs/itdownloads/mobile-devices-remote-wipe-policy-helps-protect-business-data/?cs=46620>>, Apr. 21, 2011, pp. 3.

International Search Report and Written Opinion for PCT/US2012/064005 dated Apr. 25, 2013.

"First Office Action and Search Report Issued in China Patent Application No. 201210445221.0", dated Sep. 30, 2014, 16 Pages.

"Supplementary Search Report Issued in European Patent Application No. 12848606.5", dated Mar. 9, 2015, 6 Pages.

"Second Office Action and Search Report Issued in Chinese Patent Application No. 201210445221.0", dated Jun. 15, 2015, 19 Pages.

Taiwan Office Action in Application 101138923, dated Apr. 26, 2014, 12 pages.

Chinese Office Action in Application 201210445221.1, dated Apr. 20, 2016, 9 pages.

"Third Office Action Issued in Chinese Patent Application No. 201210445221.0", dated Dec. 28, 2015, 13 Pages.

"Office Action Issued in Japanese Patent Application No. 2014-541210", dated Oct. 24, 2016, 6 Pages.

"Basic B-Link Start! BYO, Telecommunications", by RIC Telecom Co., Ltd., vol. 29, Issue 5, Apr. 25, 2012, pp. 14-15.

"Office Action Issued in European Patent Application No. 12848606.5", dated Jan. 31, 2018, 5 Pages.

Notice of Allowance Issued in Chinese Patent Application 201210445221.0, dated Oct. 18, 2016, 4 pages.

Notice of Allowance Issued in Japanese Patent Application 2015-541210, dated Apr. 29, 2017, 4 pages.

"Office Action Issued in Korean Patent Application No. 10-2014-7012369", dated Dec. 6, 2018, 8 Pages.

\* cited by examiner

Connect to enterprise server with a first enterprise application.
302

Receive a policy from the enterprise server.
304

Apply the policy to the first enterprise application.
306

```
┌─────────────────────────────────────────────┐
│  Execute a enterprise application on a      │
│  personal device.                           │
│                                             │
│                  402                        │
└─────────────────────────────────────────────┘
                      │
┌─────────────────────────────────────────────┐
│         Check device for policies.          │
│                                             │
│                  404                        │
└─────────────────────────────────────────────┘
                      │
┌─────────────────────────────────────────────┐
│   Apply policies to the enterprise          │
│   application.                              │
│                                             │
│                  406                        │
└─────────────────────────────────────────────┘
                      │
┌─────────────────────────────────────────────┐
│  Connect to enterprise server with          │
│  enterprise application from personal       │
│  device.                                    │
│                                             │
│                  408                        │
└─────────────────────────────────────────────┘
```

Generate a policy key on the personal device from the policy on the personal device.

502

Provide the policy key to the enterprise server for comparison to the policies on the server.

504

Receive a notification from the server of the policy being up to date, or needing to be updated.

506

Apply the up to date policy to the enterprise applications.

508

Update the policy and then apply to the enterprise applications.

TECHNIQUES TO APPLY AND SHARE REMOTE POLICIES ON MOBILE DEVICES

BACKGROUND

Computer and networking technologies make it possible for a business's employees to work away from the physical business site, and for customers and clients to interact with a business remotely. Increasingly, employees have chosen to use their personal mobile or home devices for work purposes. Mixing personal and enterprise data on one device may increase efficiency and convenience for the employee, but creates challenges in securing enterprise data, in particular, if the personal device is lost or stolen. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to systems and techniques for applying and sharing remote policies on mobile devices. Some embodiments are particularly directed to systems and techniques for selectively applying and sharing remote policies on mobile devices without interfering with non-enterprise data and applications on the mobile device. In one embodiment, for example, an apparatus may comprise a memory store to store personal data and enterprise data and a processing unit coupled to the memory store. The apparatus may further comprise a first enterprise application operative on the processing unit to connect to an enterprise server. When the enterprise application connects to the enterprise server, it may receive one or more policies from the enterprise server. The first enterprise application may apply the policies to itself. The apparatus may comprise additional enterprise applications that share the policies received from the enterprise server. When one of the additional enterprise applications is launched, the policies may be applied to that enterprise application as well. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Conventionally, when an employee wishes to use a personal device, such as a laptop, tablet computer, or smart phone for work purposes, the employer may apply enterprise policies to the personal device globally. In the event that the personal device is lost or stolen, or if the enterprise policies are otherwise violated, the consequences, such as erasing all data, may affect all of the data on the personal device. If the employee enters the device password incorrectly too many times in a row, for example, all of the data, including personal data such as photographs and contact information may be deleted in the interest of preserving the security of enterprise data.

Various embodiments are directed to techniques for selectively applying and sharing remote policies on personal devices. In an embodiment, a technique includes contacting an enterprise server from an enterprise application operating on a personal device. The enterprise application may receive policies from the enterprise server. The policies may be applied to the enterprise application. When a second enterprise application on the personal device is launched, the policies may also be applied to the second enterprise application. In addition, in the event that enterprise data needs to be erased, a technique includes erasing only the enterprise data, leaving any personal data intact. As a result, the embodiments can improve efficiency by allowing employees to consolidate their work and personal devices, while preserving enterprise data security.

Figure 1:
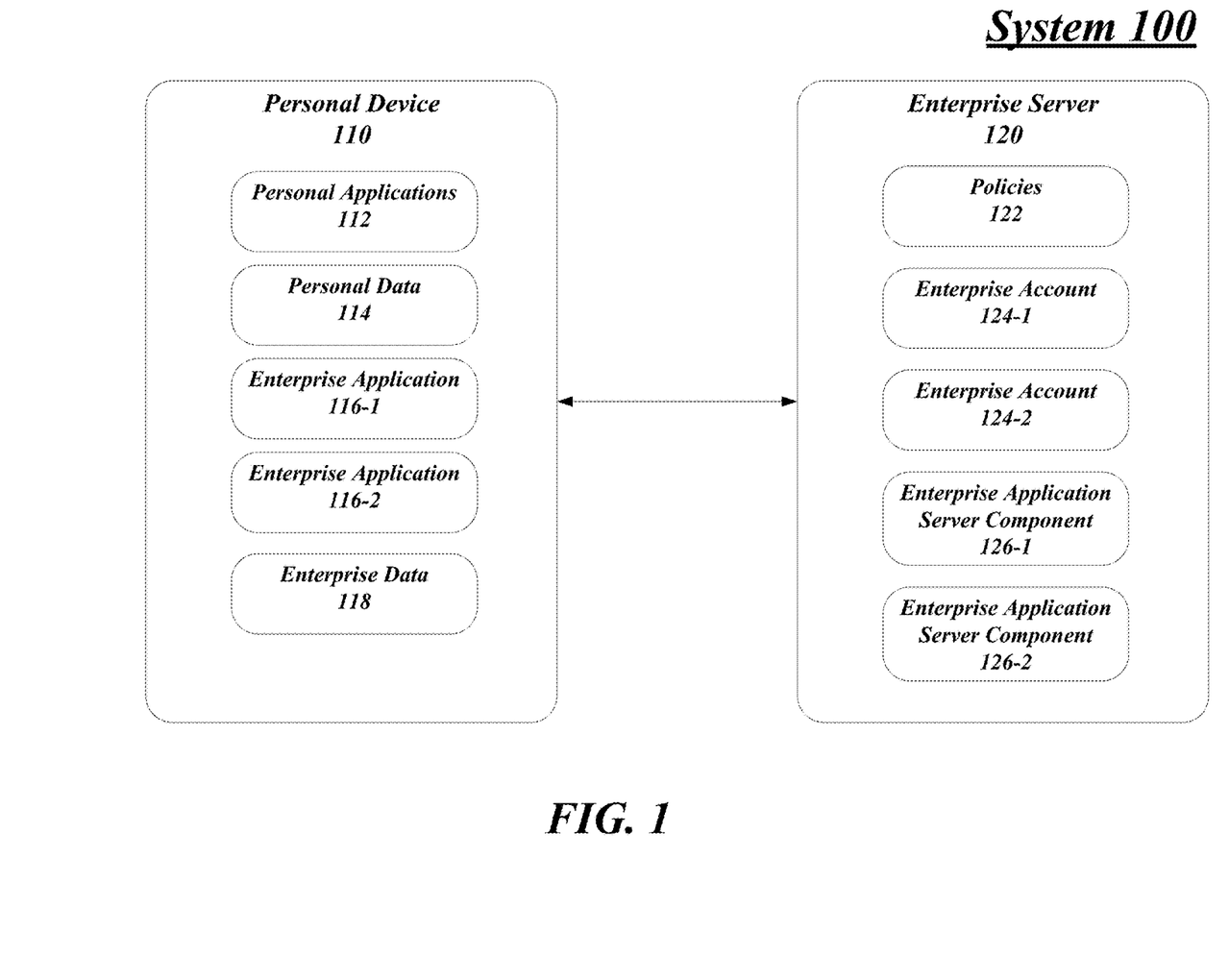
FIG. 1 illustrates an embodiment of a system for applying and sharing remote policies on personal devices.

FIG. 1 illustrates a block diagram for a system 100 to apply and share remote policies on a personal device. In one embodiment, for example, the system 100 may comprise a computer-implemented system 100 having components, such as a personal device 110, and an enterprise server 120. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the system 100 may be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the system 100 as shown in FIG. 1 has a limited number of elements in a certain topology, it may be appreciated that the system 100 may include more or less elements in alternate topologies as desired for a given implementation.

In one embodiment, as described in more detail later, an apparatus such as the personal device 110 may comprise a memory store to store personal data 114 and enterprise data 118 and a processing unit coupled to the memory store. Examples of a memory store and processing unit may be described with reference to FIG. 6. The personal device 110 may further comprise multiple enterprise applications 116, such as enterprise applications 116-1, 116-2 shown in FIG. 1, executable on the processing unit and operative to receive a policy 122 from an enterprise server 120 for the first enterprise application 116-1, and automatically apply the policy 122 for the first enterprise application 116-1 to the second enterprise application 116-2. For example, the first enterprise application 116-1 may connect to the enterprise server 120. Once the first enterprise application 116-1 connects to the enterprise server 120, it may receive one or more policies 122 from the enterprise server 120. The first enterprise application 116-1 may apply the policies 122 to itself. The personal device 110 may comprise additional enterprise applications 116 that may share the policies 122 received from the enterprise server 120, such as second enterprise application 116-2, for example. When the second enterprise application 116-2 is launched, the same policies 122 applied to the first enterprise application 116-1 may be applied to the second enterprise application 116-2 as well. This may continue for as many enterprise applications 116 that are implemented by the personal device 110. Although only two enterprise applications 116-1, 116-2 are shown in FIG. 1 by way of example and not limitation, it may be appreciated that the personal device 110 may include any number of enterprise applications 116 that can share a policy. The embodiments are not limited in this context.

Many of the embodiments described herein are described in the context of a corporation or enterprise, and an employee. The embodiments may be applied in other contexts, for example, whenever a personal device receives data from, and interacts with, a remote device or server where one or more policies are imposed to secure data on the personal device. For example, if a user on a personal device is receiving data that is restricted in some way, such as with a non-disclosure agreement, policies may be received that may prevent the protected data from being sent to another device. In another example, the corporate or enterprise entity may be a financial institution, and the user may be a customer of the financial institution. The personal device may have several application installed on it that can access the user's account at the financial institution. The financial institution may provide policies to the applications to prevent unauthorized access to the account. The embodiments are not limited to these examples.

In various embodiments, system 100 may comprise a personal device 110. Personal device 110 may include any electronic device capable of executing enterprise applications, communicating with an enterprise server, and storing data. Examples of personal devices 110 may include, without limitation, a desktop computer, a laptop computer, a tablet computer, a smart phone, and other electronic devices as previously described for the system 100.

Personal device 110 may include personal applications 112. Personal applications 112 may include applications included with personal device 110 at purchase, and applications installed by the user of personal device 110. Personal applications 112 may include, for example and without limitation, personal finance management applications, games, personal information management applications, camera applications, photo editing applications, web browsers, music player applications, video player applications, electronic mail applications, and so forth. In general, personal applications 112 may be applications that do not connect to an enterprise server 120 unless being used for work-related purposes.

Personal applications 112 may use and generate personal data 114. Personal data 114 may include settings for personal applications 112. Personal data 114 may include data generated by or with personal applications 112, such as photos, contact lists, word processing documents, bookmarks, and so forth. Personal data 114 may include data that has been copied onto or otherwise imported on personal device 110, for example, via a peer-to-peer exchange, network download, or synchronization operation with another personal device. Personal data 114 may be, generally, data that is not work-related.

Personal device 110 may include one or more enterprise applications 116, such as enterprise application 116-1 and 116-2 as shown in FIG. 1. An enterprise application 116 may include any application that can connect to an enterprise server 120 using an enterprise account for the user of personal device 110. Enterprise application 116 may include, for example and without limitation, an electronic mail application, a word processing application, a video conferencing application, a collaboration application, an inventory management application, a customer relations management application, a business project planning application, and so forth.

An enterprise application 116 may need to communicate with an enterprise server 120 on occasion, or each time the enterprise application 116 is executed on personal device 110. Enterprise application 116 may upload data to enterprise server 120 and/or receive data from enterprise server 120. In an embodiment, an enterprise application 116 may receive policies 122 from enterprise server 120. The policies 122 may impose a set of constraints on how an enterprise application 116 may operate on personal device 110. Policies 122 are discussed further below.

Personal device 110 may also include enterprise data 118. Enterprise data 118 may include data used and generated by an enterprise application 116. Enterprise data 118 may include data received from enterprise server 120. Enterprise data 118 may include data that are considered sensitive, proprietary, confidential, or secret by the entity setting policies 122. Enterprise data 118 may include, for example and without limitation, word processing documents, electronic mail messages, contact information, customer information, product information, presentation documents, publications, legal documents, and so forth.

In various embodiments, system 100 may comprise an enterprise server 120. Enterprise server 120 may include one or more electronic devices operated by one entity, such as a business, a government agency, a school, an organization, and so forth. Enterprise server 120 may be operated by one entity on behalf of another entity. Enterprise server 120 may be capable of remote communication with personal device 110, for example, via a wired or wireless network.

Enterprise server 120 may include policies 122. Policies 122 may include rules that an application needs to follow in order to interact with enterprise server 120. In particular, policies 122 may include rules that an enterprise application 116 on a personal device 110 needs to follow in order to connect with and communicate with enterprise server 120. Policies 122 may include, for example, password policies, encryption policies, wipe policies, data storage policies, and so forth.

A password policy may specify that a password needs to be created and used in order to access an enterprise application 116. A password policy may specify a requested format for a password, for example, a minimum password length, the alphanumeric characters allowed in the password, and/or a request for combinations of types characters. A request for combinations of types of characters may specific, e.g., that at least one character needs to be a numeral, at least one character needs to be a capital letter, at least one character needs to be a symbol, and so forth. A password policy may request that the enterprise applications 116 be locked after a specified period of inactivity, requiring re-entry of the password. A password policy may specify that a password expires after a specified period of time, and that a new password needs to be created. A password policy may specify that when a password for personal device 110 is compliant with policies 122, that a separate enterprise application password is not needed. The embodiments are not limited to these examples.

An encryption policy may specify that a personal device 110 needs to support encryption of data and/or network communication. An encryption policy may specify that when a personal device 110 does not support encryption, that enterprise data 118 may not be stored on personal device 110. The embodiments are not limited to these examples.

A wipe policy may specify that enterprise data 118 be erased from personal device 110 when a condition occurs, without erasing personal data 114. A condition may include receiving a wipe command from enterprise server 120. Enterprise server 120 may issue a wipe command, for example, when the user of personal device 110 reports that personal device 110 is lost or stolen. A condition may occur when a maximum number of failed (incorrect) password entry attempts is exceeded. The embodiments are not limited to these examples.

A data storage policy may specify rules for storing enterprise data 118 on personal device 110. For example, a time limit may be set for how long some types of data, e.g. word processing documents, or documents downloaded from a particular directory, may be stored. A data storage policy may specify that some types of data may not be stored at all on personal device 110. A data storage policy may specify that data may be stored only when enterprise applications 116 comply with the other policies 122. The embodiments are not limited to these examples.

Enterprise server 120 may store or make use of one or more enterprise accounts, such as enterprise account 124-1, and 124-2. An enterprise account 124 may exist for an individual user or for a group of users. An enterprise account 124 may include credential information that one or more users need to provide in order to gain access to enterprise server 120. Credential information may include, for example, a user name and password; a challenge question and answer; biometric information such as fingerprint data or retinal scan data, and so forth.

An enterprise account 124 may specify the access privileges that the user/users associated with the enterprise account may have regarding data and applications on enterprise server 120. For example, a user in one department of a corporate entity that operates enterprise server 120 may have access only to the documents and applications for that department. In another example, a user may be able to read data from enterprise server 120 but may not be able to add or modify data on enterprise server 120. In an embodiment, each enterprise application 116 on personal device 110 may be linked to the same enterprise account 124 on enterprise server 120. Once one enterprise application 116 has connected to enterprise server 120 via an enterprise account, e.g. enterprise account 124-1, other enterprise applications 116 on personal device 110 may also access enterprise server 120 using the same enterprise account 124-1.

In an embodiment, policies 122 may be related to the access privileges in an enterprise account 124. An enterprise account 124 that grants more access to data on enterprise server 120 may have more, or stricter, policies 122 to mitigate the higher risk of exposure of the more enterprise data. Policies 122 may be associated with an enterprise account 124, rather than with a specific enterprise application 116. This may allow enterprise applications 116 on a personal device 110 to share the policies among themselves when an enterprise application 116 accesses enterprise server 120 using the same enterprise account 124 as was used to receive policies 122.

Enterprise server 120 may be arranged to provide access to enterprise applications and data remotely. For example, enterprise server 120 may include one or more enterprise application server components, such as enterprise application server component 126-1 and 126-2. An enterprise application server component 126 may provide a server-side function for a corresponding enterprise application 116 on personal device 110. For example, enterprise application server component 126-1 may be an e-mail system server component to an e-mail client enterprise application 116-1. An enterprise application server component 126 may provide an interface through which an enterprise application 116 may connect to enterprise server 120, receive data and policies 122 from enterprise server 120, and upload data to enterprise server 120.

Figure 2:
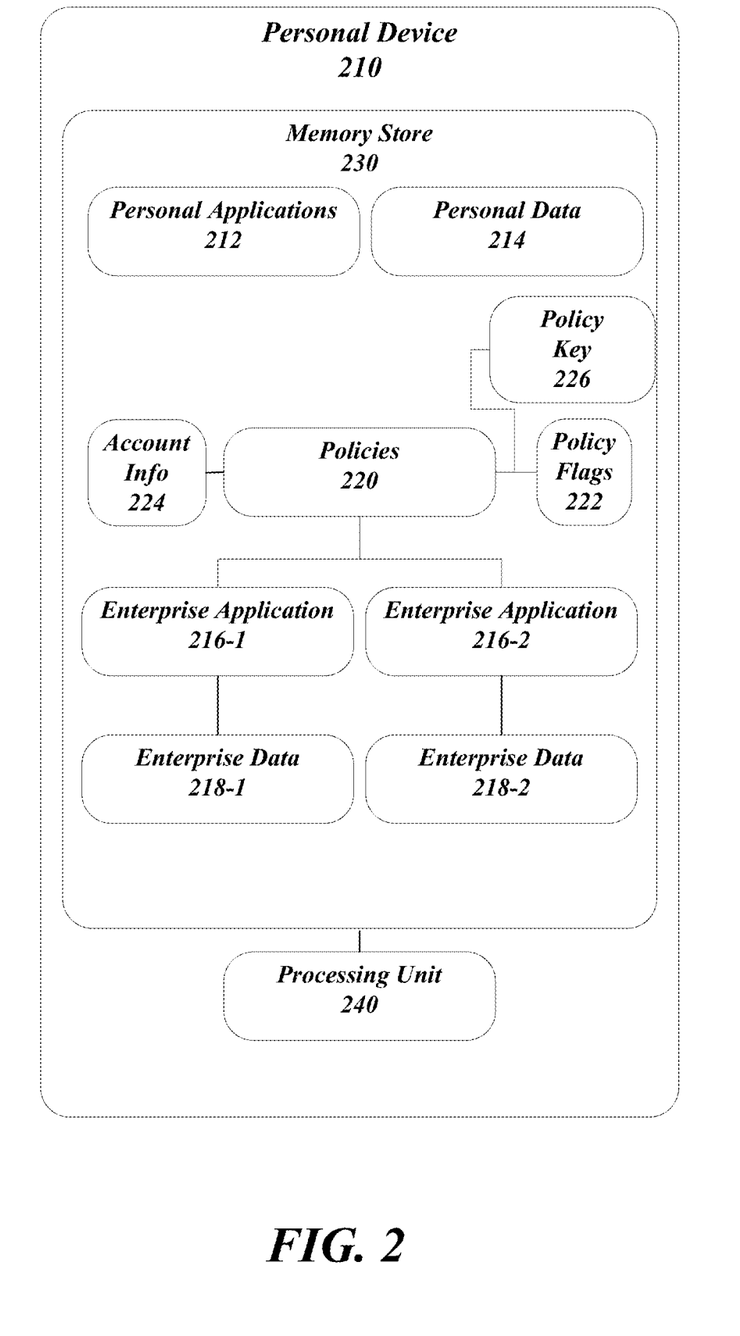
FIG. 2 illustrates an embodiment of a personal device.

FIG. 2 illustrates a block diagram of a personal device 210. Personal device 210 may be a representative embodiment of personal device 110. Personal device 210 may include a memory store 230 and a processing unit 240 coupled to the memory store 230.

Memory store 230 may include one or more computer-readable storage media, such as, but not limited to, an internal hard disk drive (HDD), a removable magnetic disk, a removable optical disk (e.g., a CD-ROM or DVD), read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information.

Processing unit 240 may include processing circuitry capable of executing programming instructions to provide the functionality described herein, including programming instructions to execute enterprise applications 216. Processing unit 240 may include any of various commercially available processors. Dual microprocessors and other multi-processor architectures may also be employed as the processing unit 240.

Memory store 230 may store programming instructions and data on personal device 210. For example, memory store 230 may store programming instructions for personal application 212, enterprise application 216-1 and enterprise application 216-2. Memory store 230 may store personal data 214, policies 220, enterprise data 218-1 and enterprise data 218-2. Personal data 214 and policies 220 may be representative of personal data 114 and policies 122, respectively, as described with reference to FIG. 1. Enterprise application 216-1 and enterprise application 216-2 may be representative of enterprise application 116-1 and 116-2, as described with reference to FIG. 1. Personal application 212 may be representative of personal application 112 as described with reference to FIG. 1. Enterprise data 218-1 and 218-2 may be representative of enterprise data 118 as described with reference to FIG. 1.

In an embodiment, enterprise data 218-1 may be stored logically separated from enterprise data 218-2, e.g. in a separate logical directory. Enterprise data 218-1 and 218-2 may be, in turn, stored logically separated from personal data 214. Alternatively, enterprise data 218-1 and 218-2 may be stored logically together in the same logical directory and separate from personal data 214. Generally, enterprise data 218-1, 281-2 may be stored in a manner that allows an enterprise application 216 to identify enterprise data 218 separately from personal data 214.

Policies 220 may be in a variety of formats. In an embodiment, for example, a policy 220 may be executable program instructions, that, when executed, cause an enterprise application 216 to apply the policy 220. In an embodiment, a policy 220 may include one or more variables having assigned values. When an enterprise application 216 is executed, the enterprise application 216 may read the values of the variables and the values may cause enterprise application 216 to apply the policy 220. The embodiments are not limited to these examples.

In an embodiment, policies 220 may include policy flags 222, which may also be stored on memory store 230. Policy flags 222 may include flags, status indicators, and/or property settings that signal to an enterprise application 216 that a policy condition is set, or not. For example, a policy flag 222 may include a policy encryption compliant flag, which, when true, indicates that personal device 210 is encryption compliant. A policy flag 222 may include a storage encryption status, which may indicate whether encryption is active. A policy flag 222 may include a wiping initiated flag, which may be set to true when an enterprise application 216 performs a wipe of enterprise data 218. A policy flag 222 may include a remote wipe flag, which may be set to true when enterprise server 120 requests a wipe of enterprise data 218 on personal device 210. A policy flag 222 may include a policy password compliant flag that indicates, when true, that a device password for personal device 210 complies with password policies and that enterprise application passwords are not needed.

In an embodiment, when a first enterprise application, e.g. enterprise application 216-1, connects to enterprise server 120 and receives policies 220 from enterprise server 120, enterprise application 216-1 may perform various checks and verifications in order to set any relevant policy flags 222. Enterprise application 216-1 may check, for example, whether personal device 210 has a device password, and if so, whether the device password complies with a password policy in policies 220. If the device password is compliant, then enterprise application 216-1 may set policy password compliant flag to true. When a second enterprise application, e.g. enterprise application 216-2, begins execution, enterprise application 216-2 may check the policy flags 222 instead of performing the checks and verifications already performed by enterprise application 216-1. If one of the policies 220 requests a password to execute an enterprise application 216, then enterprise application 216-2 can check the policy password compliant flag before prompting for a password. The embodiments are not limited to these examples.

In an embodiment, account information 224 may be stored on memory store 230. Account information 224 may include information needed, in addition to user-entered credentials, to access an enterprise account 124 on enterprise server 120. Account information 224 may include, for example, network addresses for enterprise server 120, account identifier information, and so forth. In an embodiment, an enterprise application, e.g. enterprise application 216-1, connects to enterprise server 120 using account information 224 for the first time and receives policies 220 from enterprise server 120. Policies 220 may be stored with, or linked to, account information 224. When a second enterprise application, e.g. enterprise application 216-2, is launched, enterprise application 216-2 may look up and/or use account information 224 to initiate a connection to enterprise server 120. Enterprise application 216-2 may also retrieve and apply policies 220 that are linked to account information 224.

In an embodiment, an enterprise application 216 may generate a policy key 226. Policy key 226 may reflect the set of policies 220 currently installed on personal device 210. Policy key 226 may be generated, for example, by performing a hashing operation on policies 220. Policy key 226 may be provided to enterprise server 120 for comparison to the policies 122 on enterprise server 120. When the policies reflected in policy key 226 differ from policies 122 on enterprise server 120, enterprise server 120 may inform enterprise application 216 that an update is needed. Enterprise server 120 may provide the updated policies 122 to enterprise application 216. In an embodiment, enterprise server 120 may disable data downloads to personal device 210 until the update policies are applied.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 3:
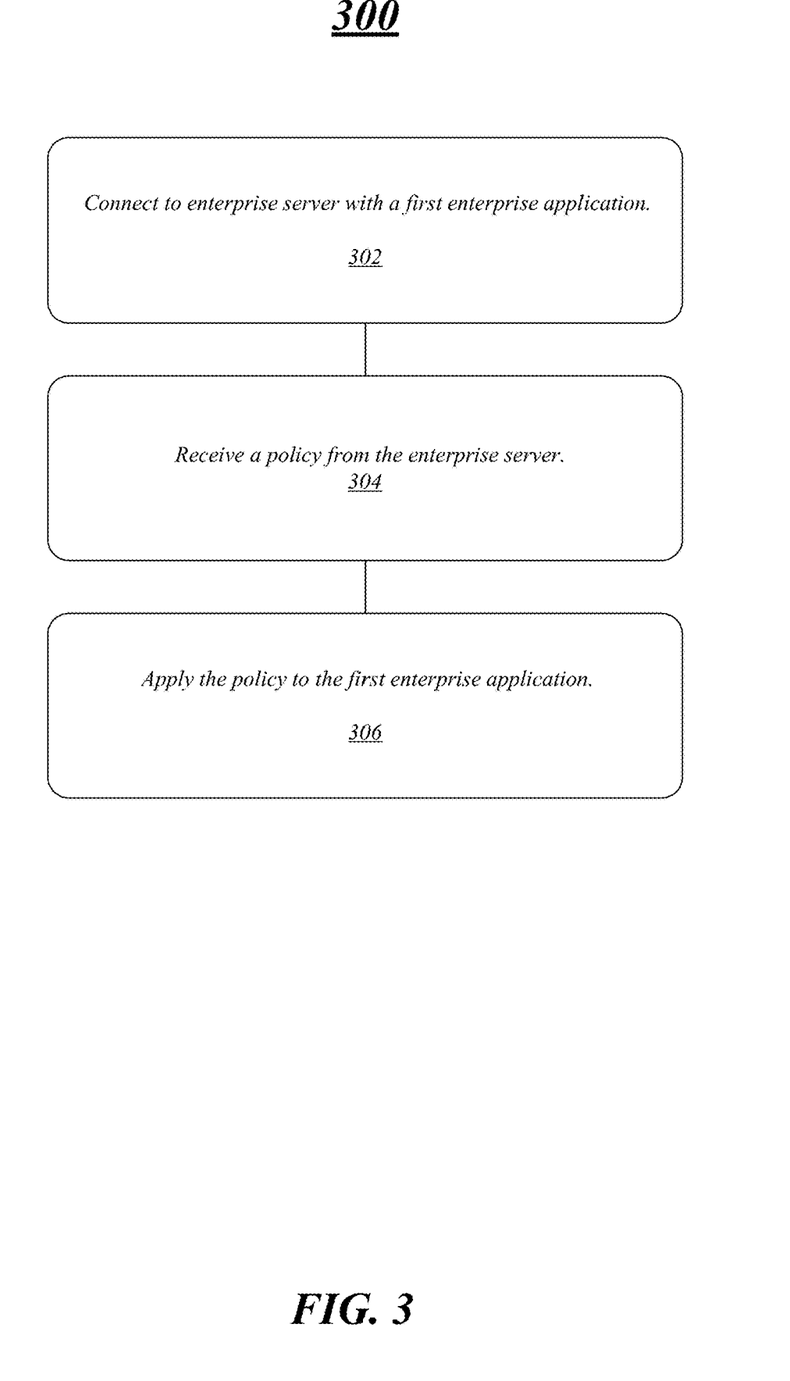
FIG. 3 illustrates an embodiment of a first logic flow for obtaining and applying remote policies on personal devices.

FIG. 3 illustrates one embodiment of a logic flow 300. Logic flow 300 may be representative of some or all of the operations executed by one or more embodiments described herein. Logic flow 300 may be performed by various systems and/or devices and may be implemented as hardware, software, and/or any combination thereof, as desired for a given set of design parameters or performance constraints. For example, the logic flow 300 may be implemented by a logic device (e.g., processor) and/or logic (e.g., threading logic) comprising instructions, data, and/or code to be executed by a logic device. For purposes of illustration, and not limitation, the logic flow 300 is described with reference to FIGS. 1 and 2. The embodiments are not limited in this context.

In the illustrated embodiment shown in FIG. 3, logic flow 300 may connect to an enterprise server with a first enterprise application from a personal device at block 302. For example, enterprise application 116-1, 216-1 may connect to enterprise server 120 over a network. Enterprise application 116-1, 216-1 may present credentials, e.g. account information 224, to enterprise server 120 to identify and access an enterprise account 124-1.

In an embodiment, it may not matter which of enterprise applications 116, 216 first connects to enterprise server 120 and receives policies 122, 220. Once the first connection is made, however, the enterprise application that made the first connection, e.g. enterprise application 116-1, may be designated as the enterprise application that maintains and updates the policies 220 and policy flags 222. In another embodiment, any of the enterprise applications 116, 216 may update the policies 220 and policy flags 222.

Logic flow 300 may receive a policy from the enterprise server at block 304. For example, enterprise application 116-1, 216-1 may receive policies 122 from enterprise server 120 over the network. Enterprise application 116-1, 216-1 may store policies 122 as policies 220 on memory store 230 of personal device 110, 210. The policies 220 may include, for example, a password policy; an encryption policy; a data wipe policy; and/or an enterprise data storage policy.

Logic flow 300 may apply the policy to the first enterprise application at block 306. For example, enterprise application 116-1, 216-1 may read and/or execute each policy 220. Enterprise application 116-1, 216-1 may check for conditions, such as whether personal device 110, 210 supports encryption, or has a device password. Enterprise application 116-1, 216-1 may set policy flags 222 according to the conditions checked.

Applying a password policy may include, for example, prompting the user of personal device 110, 210 to create and/or enter a password for enterprise application 116-1, 216-1. Applying a password policy may include enforcing a password format constraint. Applying a password policy may include requesting the re-entry of a password after a specified time period of inactivity. Applying a password may include disabling an enterprise application password constraint when the personal device 110, 210 has a password that meets or exceeds password constraints in the password policy. The embodiments are not limited to these examples.

Applying an encryption policy may include turning device encryption on when encryption is requested. Applying an encryption policy may include detecting whether device encryption is enabled and setting a policy flag 222 reflecting the device encryption enablement status for other enterprise applications 116, 216 to check. Applying an encryption policy may include checking if encryption is needed for storing enterprise data 118, 218 on the personal device 110, 210. Applying an encryption policy may include preventing enterprise data 118, 218 storage on the personal device 110, 210 when encryption is requested and device encryption is not enabled. The embodiments are not limited to these examples.

Applying a wipe policy may include receiving a wipe command from the enterprise server 120 and erasing only enterprise data 118, 218 from personal device 110, 210. Applying a wipe policy may include detecting when a maximum number of failed password entry attempts has occurred on personal device 110, 210, and erasing only enterprise data 118, 218 from personal device 110, 210. Applying a wipe policy may include erasing enterprise data 118, 218 specific to an enterprise account 124 when personal device 110, 210 is not encryption compliant and encryption is requested. The embodiments are not limited to these examples.

Applying an enterprise data storage policy may include determining whether a storage period for an item of enterprise data 218-1 has expired, and if so, erasing the item from memory store 230. In an embodiment, an enterprise application 116, 216 may request to download enterprise data 118, 218 from enterprise server 120 while connected to enterprise server 120. Applying a data storage policy may include preventing downloading of enterprise data from the enterprise server until the enterprise application requesting the enterprise data adheres to policies 122, 220. The embodiments are not limited to these examples.

Figure 4:
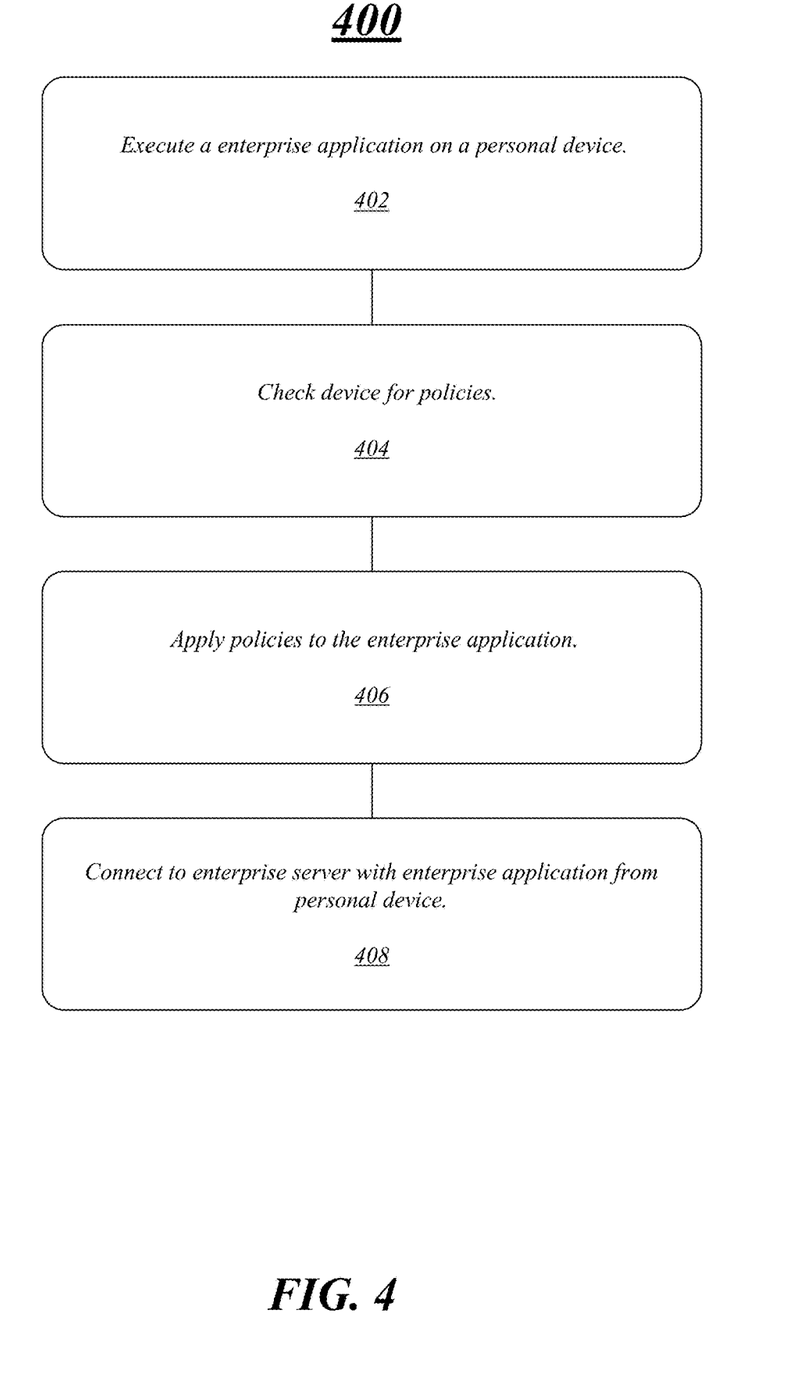
FIG. 4 illustrates an embodiment of a second logic flow for applying and sharing remote policies on personal devices.

FIG. 4 illustrates one embodiment of a logic flow 400. The logic flow 400 may be representative of some or all of the operations executed by one or more embodiments described herein. Logic flow 400 may take place after an enterprise application 116, 216 has received policies 122, 220 from enterprise server 120. Logic flow 400 may be performed by various systems and/or devices and may be implemented as hardware, software, and/or any combination thereof, as desired for a given set of design parameters or performance constraints. For example, the logic flow 400 may be implemented by a logic device (e.g., processor) and/or logic (e.g., threading logic) comprising instructions, data, and/or code to be executed by a logic device. For purposes of illustration, and not limitation, the logic flow 400 is described with reference to FIGS. 1 and 2. The embodiments are not limited in this context.

Logic flow 400 may execute a second enterprise application on a personal device in block 402. For example, enterprise application 116-2, 216-2 may begin operation on personal device 110, 210 when a user selects it for execution.

Logic flow 400 may check the personal device for policies in block 404. For example, the second enterprise application 116-2, 216-2 may look for, and find, policies 220 on memory store 230.

Logic flow 400 may apply the policies to the enterprise application in block 406. For example, enterprise application 116-2, 216-2 may apply the policies 220 in a manner similar to that described above in reference to block 306, and enterprise application 116-2, 216-1. However, in the case when a policy specifies a condition that is indicated by a policy flag 222, enterprise application 116-2, 216-2 may check the status of policy flags 222 instead of determining the status of the condition directly.

In an embodiment, other conditions set by a policy 220 may be shared among enterprise applications 116, 216. For example, suppose a policy requests that a password be re-entered after a period of inactivity, say 10 minutes. When a first enterprise application goes inactive, an inactivity timer may begin. If a second enterprise application is launched within the 10 minute window begun by the inactivity timer, the second enterprise application may not request that the password be entered. In effect, the second enterprise application is sharing the password constraint and the inactivity time window with the first application. When there is no inactivity timing constraint, a second enterprise application may still share the password entry from the first enterprise application. In that way, the second enterprise application does not need a password, because the password was already entered for the first enterprise application.

Logic flow 400 may connect to the enterprise server with the enterprise application from the personal device in block 408. In an embodiment, connection to enterprise server 120 may only occur when the policies are properly applied. If, for example, an enterprise application 116, 216 is supposed to request a password but fails to request it, then connection to enterprise server 120 through that enterprise application may be denied.

Figure 5:
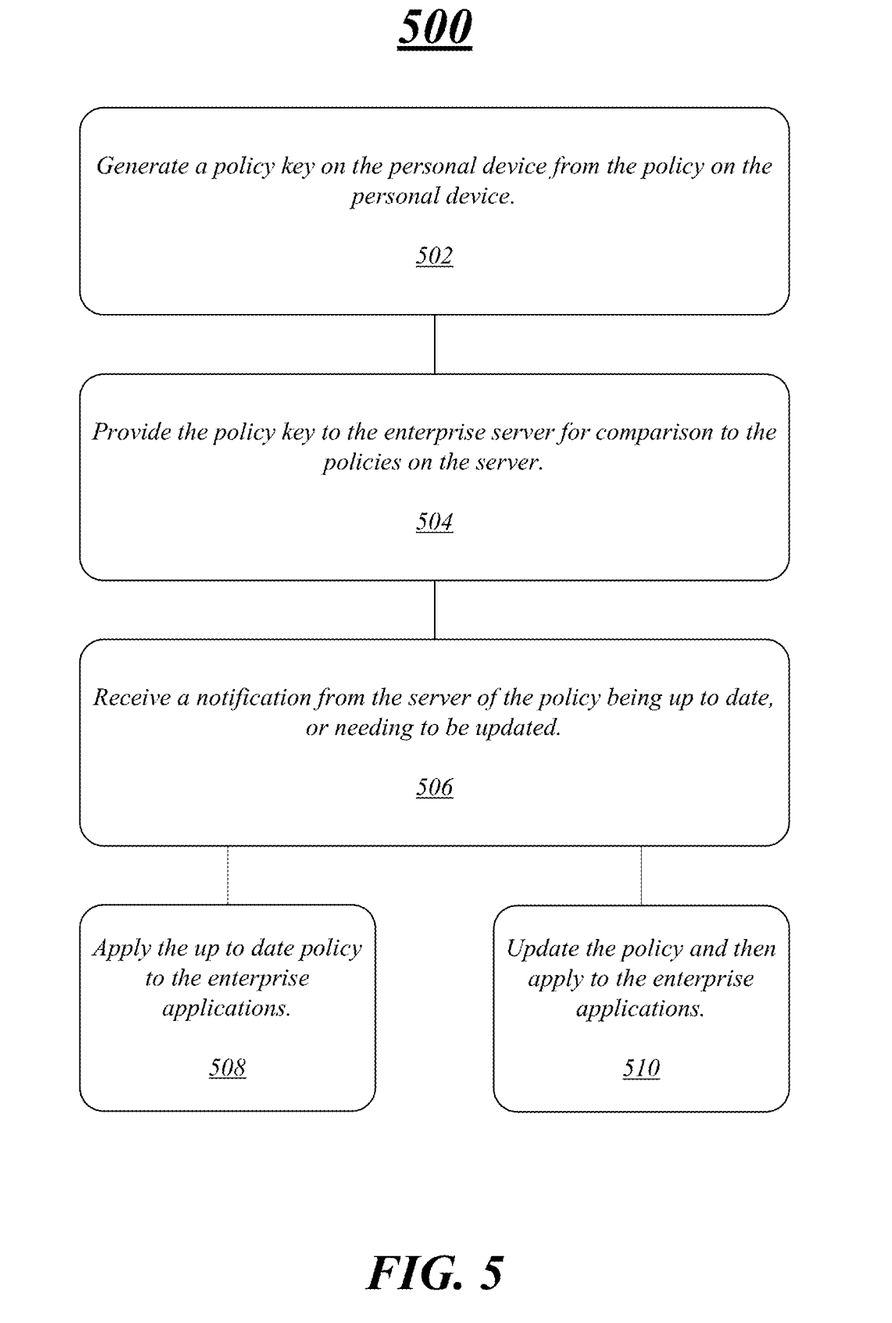
FIG. 5 illustrates an embodiment of a third logic flow for updating remote policies.

FIG. 5 illustrates one embodiment of a logic flow 500. The logic flow 500 may be representative of some or all of the operations executed by one or more embodiments described herein. Logic flow 400 may take place after an enterprise application 116, 216 has received policies 122, 220 from enterprise server 120. Logic flow 500 may be performed by various systems and/or devices and may be implemented as hardware, software, and/or any combination thereof, as desired for a given set of design parameters or performance constraints. For example, the logic flow 500 may be implemented by a logic device (e.g., processor) and/or logic (e.g., threading logic) comprising instructions, data, and/or code to be executed by a logic device. For purposes of illustration, and not limitation, the logic flow 400 is described with reference to FIGS. 1 and 2. The embodiments are not limited in this context.

Logic flow 500 may generate a policy key on the personal device from the policies on the personal device in block 502. For example, enterprise application 116-1, 216-1 may perform a hashing function on policies 122, 220 to generate a policy key 226 that reflects policies 122, 220 currently installed on personal device 110, 210.

Block 502 may be performed periodically, for example, every time enterprise application 116-1, 216-1 connects to enterprise server 120, one a day, once a week, and so forth. In an embodiment, block 502 may be performed on a schedule specified in a policy 122, 220. Block 502 may be performed in response to receiving a push notification from the enterprise server that a policy has been added, changed, and/or deleted.

Logic flow 500 may provide the policy key to the enterprise server for comparison to the policies currently on the enterprise server in block 504. Enterprise server 120 may compare policy key 226 to policies 122 to determine whether the policies are the same on both enterprise server 120 and personal device 110, 210.

Logic flow 500 may receive a notification from the enterprise server in block 506. The notification may confirm to enterprise application 116-2, 216-1 that policies 220 on personal device 110, 210 are up to date. The notification may inform enterprise application 116-2, 216-1 that policies 220 need to be updated.

Logic flow 500 may apply the up to date policies to the enterprise applications in block 508, when the policies 220 are up to date. Logic flow 500 may download and update the policies from enterprise server 120, and apply the updated policies to the enterprise applications in block 501.

Figure 6:
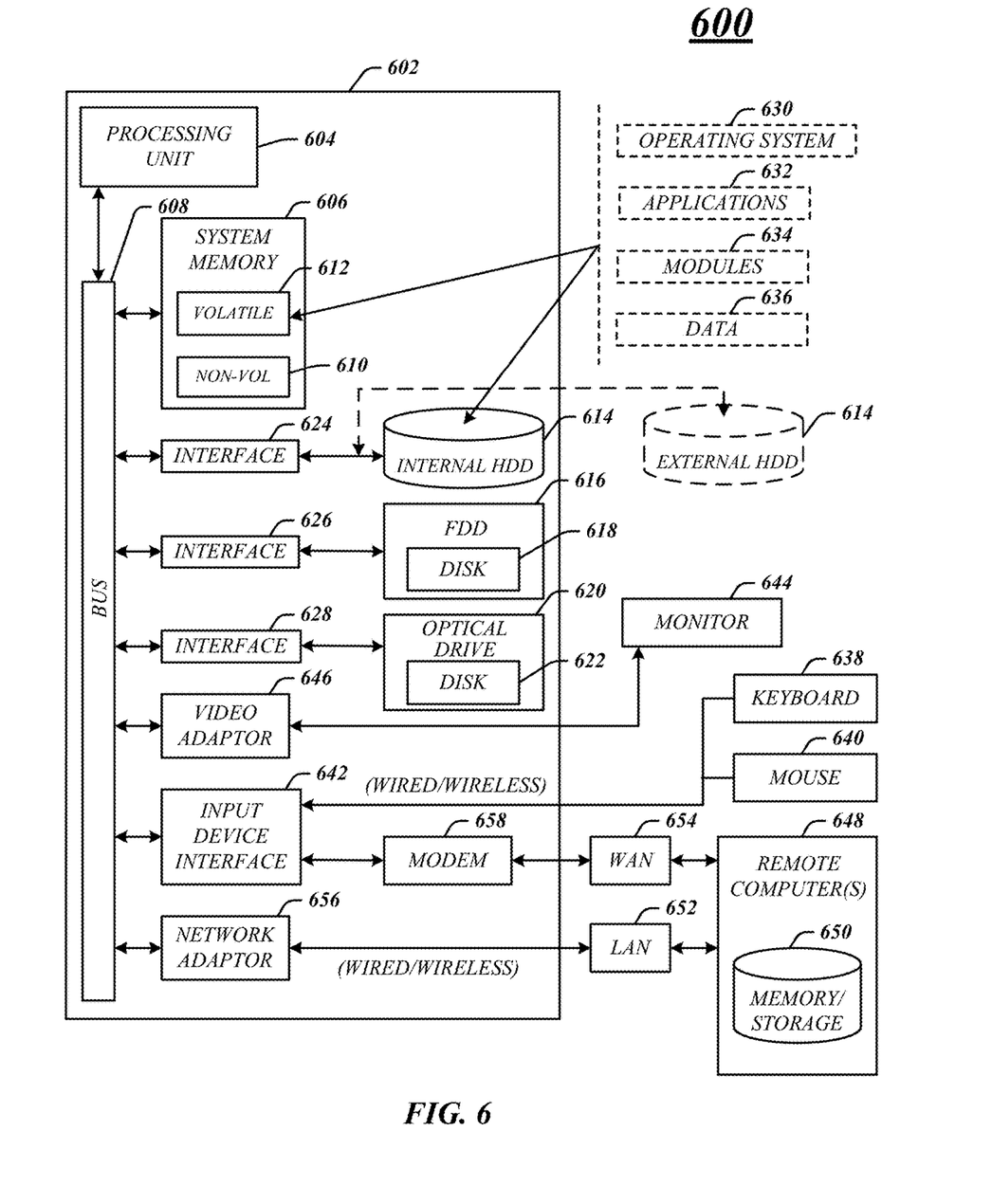
FIG. 6 illustrates an embodiment of a computing architecture.

FIG. 6 illustrates an embodiment of an exemplary computing architecture 600 suitable for implementing various embodiments as previously described. The computing architecture 600 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors. Dual microprocessors and other multi-processor architectures may also be employed as the processing unit 604. The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures.

The system memory 606 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media, including an internal hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. The one or more application programs 632, other program modules 634, and program data 636 can include, for example, the enterprise applications 116, 216, the personal applications 112, 212, and enterprise application server components 126-1, 126-2.

A user can enter commands and information into the computer 602 through one or more wire/wireless input devices, for example, a keyboard 638 and a pointing device, such as a mouse 640. Other input devices may include a microphone, an infra-red (IR) remote control, a joystick, a game pad, a stylus pen, touch screen, or the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 702 family of standards, such as wireless devices operatively disposed in wireless communication (e.g., IEEE 702.7 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 702.7x (a, b, g, etc.) to provide secure, reliable, fast wireless connectivity. A Wi-Fi network can be used to connect computers to each other, to the Internet, and to wire networks (which use IEEE 702.3-related media and functions).

Figure 7:
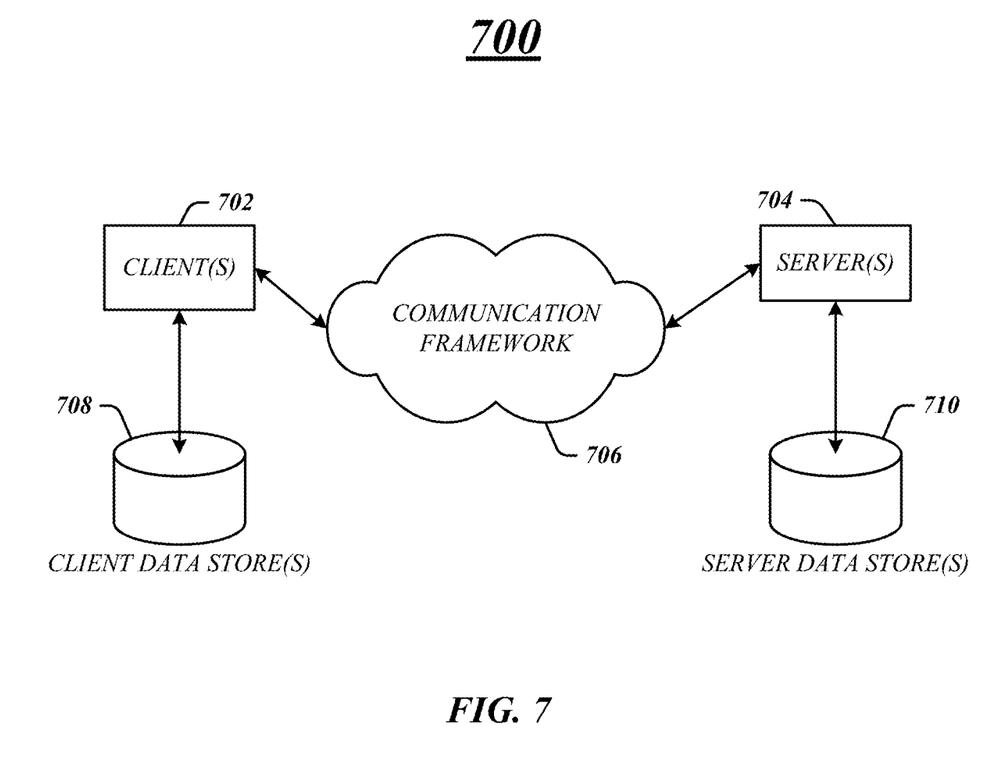
FIG. 7 illustrates an embodiment of a communications architecture.

FIG. 7 illustrates a block diagram of an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, and so forth. The embodiments, however, are not limited to implementation by the communications architecture 700.

As shown in FIG. 7, the communications architecture 700 includes one or more clients 702 and servers 704. The clients 702 may implement the personal devices 110, 210. The servers 704 may implement enterprise server 120. The clients 702 and the servers 704 are operatively connected to one or more respective client data stores 708 and server data stores 710 that can be employed to store information local to the respective clients 702 and servers 704, such as cookies and/or associated contextual information.

The clients 702 and the servers 704 may communicate information between each other using a communication framework 706. The communications framework 706 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 702 and the servers 704 may include various types of standard communication elements designed to be interoperable with the communications framework 706, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 702 and a server 704 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a pre-defined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments need more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical constraints on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
connecting to an enterprise server with a first enterprise application on a personal device using an enterprise account for a user of the personal device, the first enterprise application selected from among a group of applications including an electronic mail application, a word processing application, a video conferencing application, and a collaboration application;
receiving a policy for the first enterprise application from the enterprise server at the first enterprise application, the policy comprising one or more rules that one or more applications must follow to interact with the enterprise server; the policy comprising a password policy including a requirement for re-entry of a password after a specified period of inactivity;
applying, by a processor circuit, the policy to the first enterprise application;
applying, by the processor circuit, the policy to a second enterprise application on the personal device automatically when the second enterprise application is used;
generating a policy key at the personal device representing the policy applied to the first and second enterprise applications on the personal device; and
transmitting the policy key from the personal device to the enterprise server to validate compliance with the policy by the personal device;
wherein activity within either of the first enterprise application or the second enterprise application satisfies the password policy to avoid re-entry of the password in either of the first enterprise application or the second enterprise application within the specified period; and
wherein at least one aspect of the policy is not applied to a non-enterprise application on the personal device.

2. The method of claim 1, wherein the policy further comprises at least one of:
an encryption policy; or
a data wipe policy.

3. The method of claim 2, wherein applying the password policy further comprises enforcing at least one of:
receiving a password to use an enterprise application;
a password format; or
disabling an enterprise application password constraint when the personal device has a password that meets or exceeds password constraints in the password policy.

4. The method of claim 2, wherein applying an encryption policy comprises enforcing at least one of:
turning device encryption on when encryption is requested;
detecting whether device encryption is enabled and setting a policy flag reflecting the device encryption enablement status for other enterprise applications to check;
checking if encryption is needed for storing enterprise data on the personal device; or
preventing enterprise data storage on the personal device when encryption is requested and device encryption is not enabled.

5. The method of claim 2, wherein applying a data wipe policy comprises at least one of:
receiving a wipe command from the enterprise server and erasing only enterprise data from the personal device;

detecting when a maximum number of failed password entry attempts has occurred on the personal device, and erasing only enterprise data from the personal device; or erasing enterprise data specific to an enterprise account when the personal device is not encryption compliant and encryption is requested.

6. The method of claim 1, further comprising:

receiving a push notification from the enterprise server that a policy has been one of added, changed, or deleted;

receiving an added, changed or deleted policy;

applying the added or changed policy; and removing a deleted policy.

7. The method of claim 1, further comprising preventing download of enterprise data from the enterprise server until the enterprise application requesting the enterprise data adheres to the policy.

8. The method of claim 1, further comprising:

providing the policy key to the enterprise server for comparison to the policy on the enterprise server; and receiving a notification from the enterprise server that the policy on the personal device is up to date or the policy on the personal device needs to be updated.

9. The method of claim 1, wherein each enterprise application on the personal device is linked to a same one enterprise account on the enterprise server.

10. An article of manufacture comprising a computer-readable storage device containing instructions that when executed cause a system to:

receive a policy from an enterprise server for a first enterprise application at the first enterprise application, the first enterprise application using an enterprise account for a user of a personal device to connect to the enterprise server, the policy comprising one or more rules that the one or more applications must follow to interact with the enterprise server; the policy comprising a password policy including a requirement for re-entry of a password after a specified period of inactivity, the first enterprise application selected from among a group of applications including an electronic mail application, a word processing application, a video conferencing application, and a collaboration application;

apply the policy to the first enterprise application;

apply the policy to a second enterprise application on the device when the second enterprise application is used;

generate a policy key at the personal device representing the policy applied to the first and second enterprise applications on the personal device; and transmit the policy key from the personal device to the enterprise server to validate compliance with the policy by the personal device;

wherein activity within either of the first enterprise application or the second enterprise application satisfies the password policy to avoid re-entry of the password in either of the first enterprise application or the second enterprise application within the specified period; and wherein at least one aspect of the policy is not applied to a non-enterprise application on the personal device.

11. The article of claim 10, the computer-readable storage device further comprising instructions that when executed cause the system to prevent download of enterprise data from the enterprise server until the enterprise application requesting the enterprise data adheres to the policy.

12. The article of claim 10, wherein transmitting the policy key from the personal device to the enterprise server to validate compliance with the policy by the personal device includes causing the system to:

provide the policy key to the enterprise server for comparison to the policy on the enterprise server; and receive a notification from the enterprise server that the policy on the personal device is up to date or the policy on the personal device needs to be updated.

13. The article of claim 10, wherein the policy comprises a password policy, the computer-readable storage device further comprising instructions that when executed cause the system to enforce at least one of:

receive a password to use an enterprise application;

a password format; and disabling an enterprise application password constraint when the personal device has a password that meets or exceeds password constraints in the password policy.

14. The article of claim 10, wherein the policy is an encryption policy, the computer-readable storage device further comprising instructions that when executed cause the system to enforce at least one of:

turning device encryption on when encryption is requested;

detecting whether device encryption is enabled and setting a policy flag reflecting the device encryption enablement status for other enterprise applications to check;

checking if encryption is needed for storing enterprise data on the personal device; or preventing enterprise data storage on the personal device when encryption is needed and device encryption is not enabled.

15. The article of claim 10, wherein the policy is a wipe policy, the computer-readable storage device further comprising instructions that when executed cause the system to at least one of:

receive a wipe command from the enterprise server and erase only enterprise data from the personal device;

detect when a maximum number of failed password entry attempts has occurred on the personal device, and erase only enterprise data from the personal device; or erase enterprise data specific to an enterprise account when the personal device is not encryption compliant and encryption is needed.

16. The article of claim 10, the computer-readable storage device further comprising instructions that when executed cause the system to connect the first enterprise application to the enterprise server and the second enterprise application to the enterprise server using a same one enterprise account on the enterprise server.

17. An apparatus, comprising:

a memory store to store personal data and enterprise data;

a processing unit coupled to the memory store; and multiple enterprise applications executable on the processing unit and operative to connect to an enterprise server using an enterprise account for a user of a personal device, receive a policy for a first enterprise application from the enterprise server at the first enterprise application, and automatically apply the policy for the first enterprise application to a second enterprise application, the policy comprising one or more rules that one or more applications must follow to interact with the enterprise server; the policy comprising a password policy including a requirement for re-entry of a password after a specified period of inactivity;

wherein the first enterprise application is selected from among a group of applications including an electronic mail application, a word processing application, a video conferencing application, and a collaboration application; and wherein the apparatus generates a policy key representing the policy applied to the first and second enterprise applications and transmits the policy key from the personal device to the enterprise server to validate compliance with the policy by the personal device;

wherein activity within either of the first enterprise application or the second enterprise application satisfies the password policy to avoid re-entry of the password in either of the first enterprise application or the second enterprise application within the specified period; and wherein at least one aspect of the policy is not applied to a non-enterprise application on the personal device.

18. The apparatus of claim 17, comprising:

the first enterprise application operative to connect to the enterprise server, receive the policy from the enterprise server, set a policy flag reflecting a policy condition, and apply the policy to the first enterprise application; and the second enterprise application operative to check the policy flag, and automatically apply the policy according to the policy flag to the second enterprise application when the policy flag is set.

19. The apparatus of claim 17, wherein, in transmitting the policy key from the personal device to the enterprise server, the first enterprise application is operative to provide the policy key to the enterprise server for comparison to the policy on the enterprise server, and receive a notification from the enterprise server that the policy is up to date or needs to be updated.

20. The apparatus of claim 17, wherein the first and second enterprise applications are linked to a same enterprise account on the enterprise server.

* * * * *